United States Patent [19]

Fix

[11] Patent Number: 5,632,344
[45] Date of Patent: May 27, 1997

[54] CULTIVATOR

[76] Inventor: Wolfram M. Fix, RMB 4801, Daylesford, Victoria, Australia, 3460

[21] Appl. No.: 538,500

[22] Filed: Sep. 29, 1995

[30] Foreign Application Priority Data

Jul. 5, 1994 [AU] Australia .................. PM 6642

[51] Int. Cl.$^6$ .................. A01C 5/00; A01B 33/00
[52] U.S. Cl. .................. 172/111; 111/52; 172/59
[58] Field of Search .................. 111/133, 52, 160; 172/4, 4.5, 7, 47, 49.5, 59, 68, 111, 112, 123, 160, 713

[56] References Cited

U.S. PATENT DOCUMENTS

| | | | |
|---|---|---|---|
| 3,534,817 | 10/1970 | Garis et al. | 172/49.5 X |
| 3,638,539 | 2/1972 | Lewis | 172/49.5 X |
| 4,051,904 | 10/1977 | van der Lely et al. | 172/49.5 |
| 4,072,196 | 2/1978 | van der Lely | 172/68 X |
| 4,147,117 | 4/1979 | van der Lely et al. | 172/49.5 X |
| 4,544,038 | 10/1985 | Schonert | 172/111 X |
| 4,936,390 | 6/1990 | Anderson et al. | 172/68 X |
| 5,152,347 | 10/1992 | Miller | 172/7 |
| 5,287,932 | 2/1994 | Fleck | 172/111 X |

*Primary Examiner*—Terry Lee Melius
*Assistant Examiner*—Robert Pezzuto
*Attorney, Agent, or Firm*—Richard M. Goldberg

[57] ABSTRACT

A cultivator which may be attached to a tractor or similar vehicle for use in cultivating rows of plants, includes a rotary tine assembly having a plurality of vertically-oriented, rotary tines for cultivating soil on each side of a row of plants; shields associated with each row of plants for limiting throwing of soil by the rotary tines; a drive motor for moving the rotary tines to cultivate the soil; and a support structure for securing the rotary tines, the shields, and the drive motor thereto and which is adapted for connection to the tractor or similar vehicle, wherein dimensions of and relative adjustments of the tines and the shields are chosen so that a predetermined amount of soil passes between selected shields, whereby weeds between adjacent rows of plants may be uprooted and/or destroyed and soil may be ridged and heaped around the plants and in the rows.

18 Claims, 7 Drawing Sheets

CULTIVATOR

FIELD OF THE INVENTION

This invention relates to a cultivator and in particular to a cultivator which may be attached to a tractor or similar vehicle for use in cultivating between rows of plants and between plants.

BACKGROUND OF THE INVENTION

Market gardeners plant vegetables, flowers and fruits in rows in cultivated areas, the areas being relatively quite image. A problem arises, particularly when plants are young, in that weeds compete with the desired plants. Traditional methods of dealing with this problem include mechanical cultivation, spraying with selective herbicides and/or hiring labour to hand hoe between plants.

Soil cultivating and loosening implements are known in which tines or blades are fixed or driven in a rotary or oscillating motion. These implements disturb the soil but do not deal with the problem of weeding between rows of plants and around plants in such rows.

It would be particularly desirable to develop a mechanical means to alleviate the problem discussed above, reduce the cost of labour and chemicals and deal with the problem in an environmentally friendly way.

BRIEF SUMMARY OF THE INVENTION

This invention provides a cultivator which may be attached to a tractor or similar vehicle for use in cultivating rows of plants which comprises:

1. rotary tine means, comprising at least one substantially vertically-oriented, rotary tine means, each adapted for cultivating the soil on each side of a row of plants and throwing some soil towards
2. shield means for each row or plants;
3. drive themes for the rotary tine means; and
4. support structure means for attachment of the rotary tine means, the shield means, and the drive means and which is adapted for connection to the tractor or similar vehicle, wherein the dimensions of and relative adjustments of the tine means and the shield means are chosen so that a predetermined amount of soil passes between selected shield means, whereby weeds between the adjacent rows of plants may be uprooted and/or destroyed and soil may be ridged and heaped around the plants and in the rows.

This invention further provides a rotary tine means for use in such a cultivator as described above, which comprises:

1. connector means for attachment of a hub means to a cultivator; and
2. a plurality of tines attached to the hub means, each tine being adapted for positioning;
   (a) in a substantially vertical configuration or according to a variable angular configuration in use; and/or
   (b) at a variable distance from an axial line through the hub to provide an adjustable working perimeter: and wherein the tines are so shaped that, in operation, adjustment of their attachment to the hub means alters the area and/or depth of soil cultivated.

BRIEF DESCRIPTION OF THE DRAWINGS

One embodiment of the cultivator according to the invention is illustrated in the accompanying drawings in which.

DETAILED DESCRIPTION OF THE INVENTION

The rotary tine means may be single or multiple in construction and the tines may be constructed according to a variety of shapes and take up a variety of angular configurations. In one embodiment a tine may be fashioned out of rod which may be bent at one, two or more regions. Furthermore such a the may be provided with a shaped digging end. Tines may be replaced by vertical bristle brushes, where desired.

Preferably the cultivator according to the invention is provided with at least one interior rotary tine means for cultivation beside rows of plants, shield means for each row of plants and at least one exterior, rotary tine means located outside each shield means for cultivation outside the rows of plants.

Preferably each shield means comprises plate means, each plate means being positioned substantially vertically and being so shaped as to guide plants into a protected region within each shield metals. The shield means may be adjustable as to angle and/or height.

The drive means for the rotary tine means is conveniently an endless chain adapted to co-operate with toothed sprocket means forming part of the rotary tine means. Alternatively the drive means may comprise one or more hydraulic motors, for example, a series of hydraulic motors coupled together. The drive motor, whether hydraulic or otherwise, may be coupled to the various tine means by a common drive shaft, for example, through individual gear boxes.

The support structure is preferably connected to a three-point linkage of a tractor for improved stability of connection and guidance of the cultivator. Preferably the support structure may be adjusted from a standard position above the earth and adjacent to the chassis of the tractor or similar vehicle to an operative position for cultivation of the earth. The support structure may be extended outwards depending on requirements, for example, to 8 metres for cotton (4 m×2).

Preferably the cultivator is provided with a sensor arm adapted to sense the level of the soil and transmit a signal to apparatus adapted to raise and to lower the cultivator so that the tine means contact the soil to the desired degree.

The cultivator according to the invention may be mounted on the front or rear of the tractor or may be mid-mounted under the tractor. The embodiment mounted below is designed to be mounted on the front three-point linkage of a tractor. A monitor camera may be used to assist the guidance of the cultivator. Alternatively a mirror or mirrors may be used for the same purpose.

Figure 1:
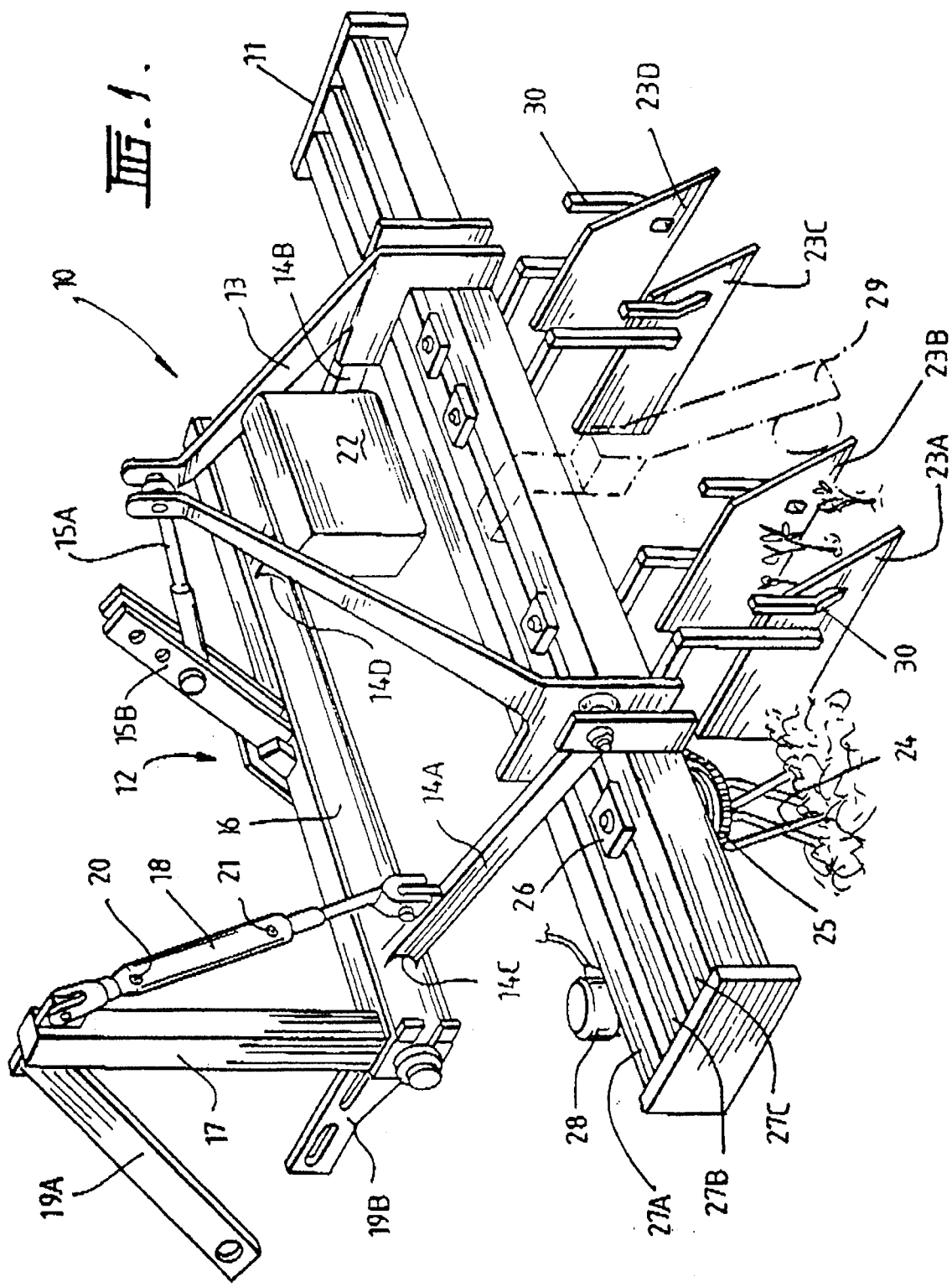
FIG. 1 is a front, perspective view of the cultivator viewed slightly from the left.

Turning now to the accompanying drawings, in FIG. 1 numeral 10 refers to the cultivator as a whole and numeral 11 to a mounting frame forming part of the cultivator. A carriage 12 is connected to platform 11 by way of an A-frame 13, the mounting frame being suspended from the A-frame. This A-frame 13 is connected pivotally, near the bottom of each arm of the A-frame, to lower links 14A and 14B respectively. The top of the A-frame 13 is pivotally attached by means of top link 15A to beam 15B which projects upwardly at an angle from a girder 16 forming part of carriage 12.

An anchor post 17 projects upwards from girder 16 at some distance from beam 15B. The purpose of anchor post 17 is to support a hydraulic ram 18. This hydraulic ram 18 is attached to lower link 14A which is pivotally attached to girder 16 by pivot point 14C. (All equivalent pivot point 14D provides a pivotal connection between lower link 14B and girder 16.) An upper connector 19A and a lower connector 19B are connected to anchor post 17 near its top and girder 16 near one end respectively. Hydraulic ram 18 is supplied with a breather port 20 and a supply and return port 21 for hydraulic fluid.

Numeral 22 refers to a housing for electronic equipment.

Two sets of soil shields 23A, 23B and 23C, 23D are shown depending from platform 11. A tine means 24 is shown immediately below a sprocket chain 25. (The purpose of the sprocket chain will be explained below.) The tine means 24 is supported by mounting frame 11 by means of tine means support plates, one of which is designated by numeral 26. Mounting frame 11 comprises an array of three longitudinal beams 27A, 27B and 27C.

A hydraulic motor 28 is shown connected to the rear of platform 11. (Again, its purpose will appear below.) A sensor arm 29 is shown in ghost lines. (It is described below with reference to FIG. 2.) Numeral 30 refers to one of a number of fertiliser supply tubes on soil shields 23A, 23B, 23C and 23D.

Figure 2:
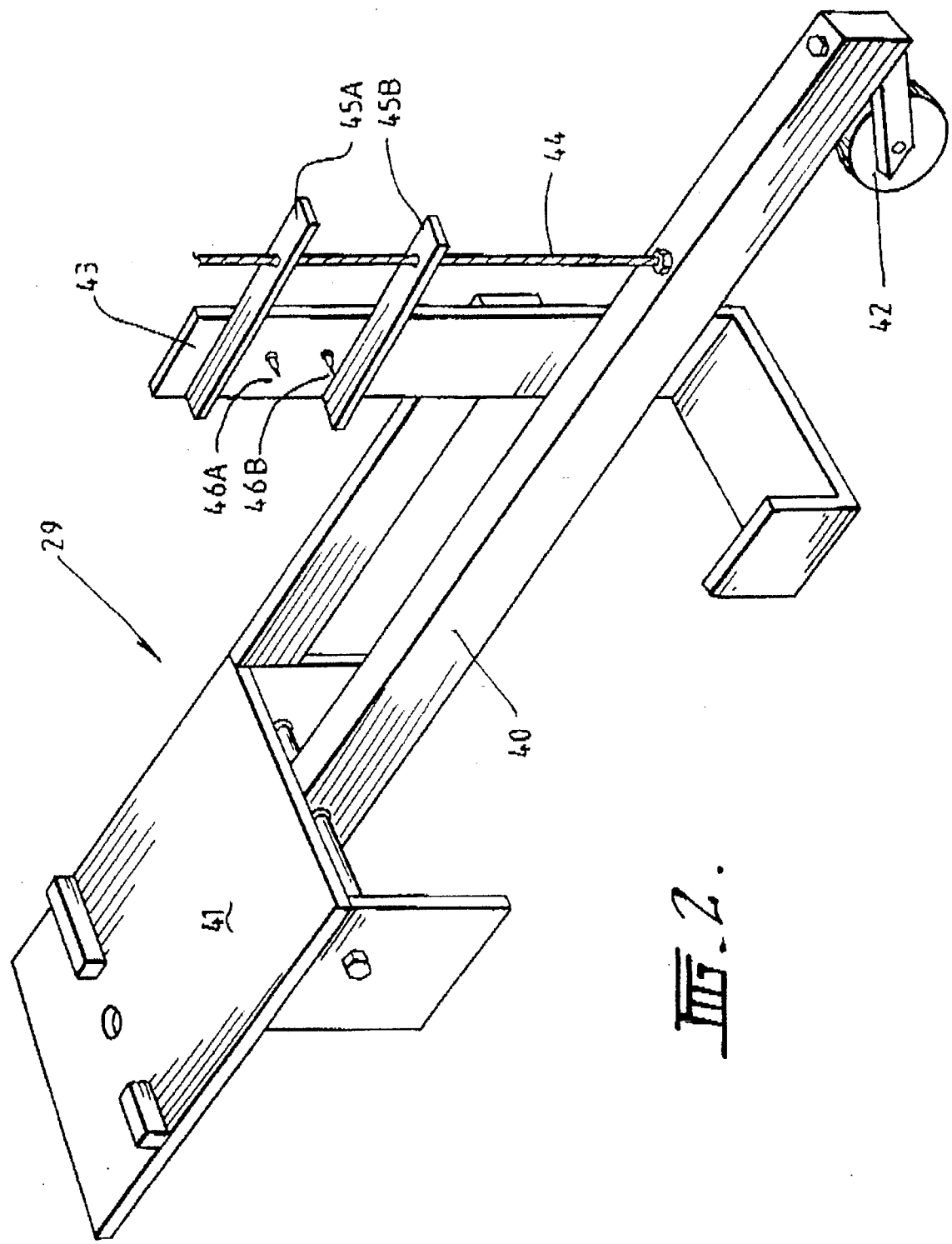
FIG. 2 is a front, perspective view viewed slightly from the left of a sensor arm shown in ghost outline in FIG. 1.

Referring to FIG. 2, sensor arm 29 comprises an elongated spar 40 to which is attached a pivoting bracket 41 at one end. At the other end of spar 40 is attached a ground contact wheel 42. Part way along spar 40, relatively close to the ground contact wheel 42 is attached an L-shaped mast 43. Immediately adjacent mast 43 is located threaded rod 44 also attached to spar 40. Threadably connected to threaded rod 44 are two switching plates 45A and 45B. Two proximity switches 46A and 46B are located on mast 43. As ground contact wheel 42 rides over the soil and sensor arm 29 moves up and down, proximity switches 46A and 46B are in a fixed position but may be adjusted in position. Switching plates 45A and 45B determine switching of equipment (not shown) to relay signals concerning soil level and relative position to control apparatus (not shown).

Figure 3:
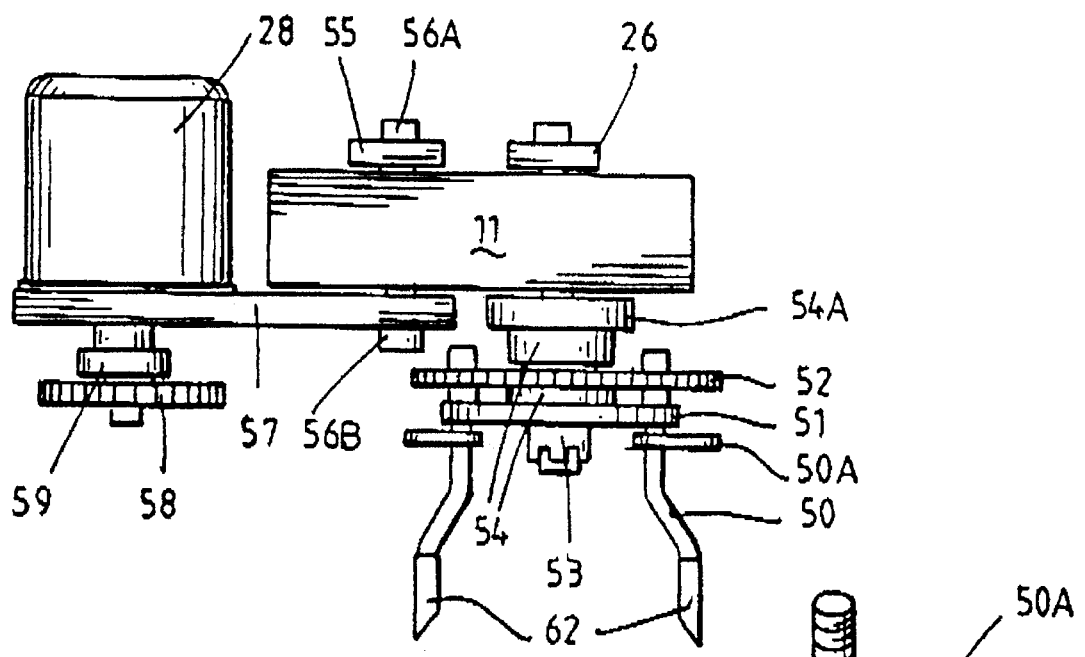
FIG. 3 is a cross-sectional view of a tine means in association with a hydraulic motor.
Figure 5:
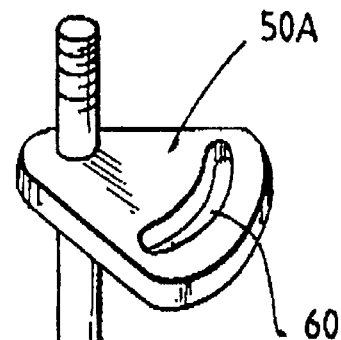
FIG. 5 is a perspective view from one side of a tine.

Turning to FIG. 3, a tine 50 is shown penetrating a circular tine plate 51 to which is attached a rotating cam 50A; for the purpose of the rotating cam see later and see FIG. 4. Tine 50 then penetrates drive sprocket 52. A retaining nut 53 is shown immediately below hub 54, which is secured to platform 11 by support plate 26.

Hydraulic motor 28 is in turn secured to mounting frame 11 by support plate 55 and nut and bolt combination 56A, 56B. The hydraulic motor sits on motor support 57 and drives motor sprocket 58 through hub 59.

Figure 4:
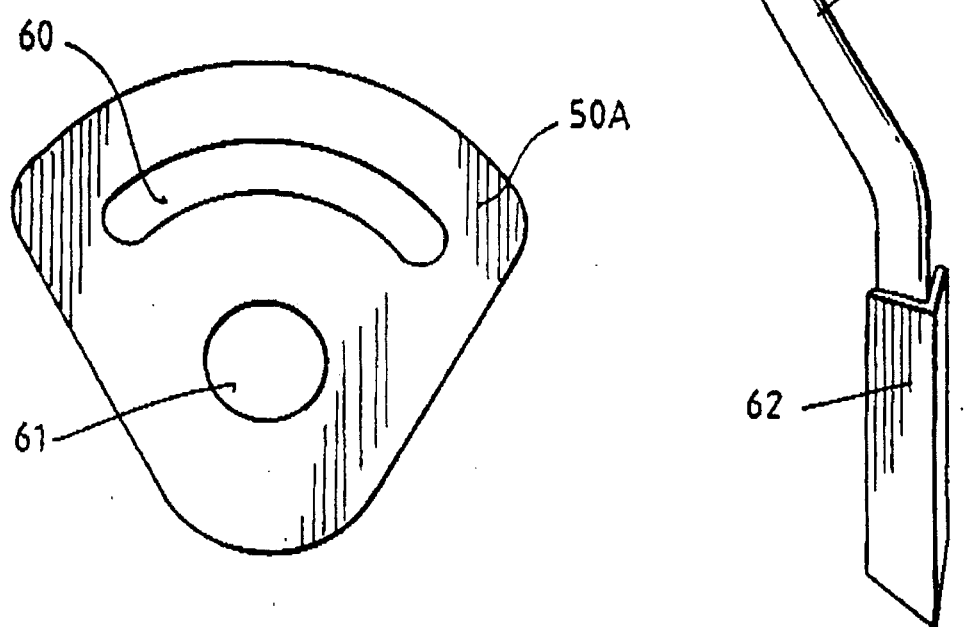
FIG. 4 is a plan view or a tine guide.

Referring to FIG. 4, a rotating cam 50A has a generally fan-like shape with an arcuate slot 60 located adjacent that curved side distal from the apex of the fan-like shape. A round aperture 61 is located near the apex of the fan-like shape. The purpose of the rotating cam 50A is to provide a means for altering the radial distance of the bottom end of a tine such as tine 50 from an axial line through hub 54. Tine 50 passes through round aperture 61 and is welded thereto. A bolt and nut (not shown) may be made to travel around arcuate slot 60 causing tine 507 to rotate and hence alter the radial distance of its bottom end from the abovementioned axial line, and secure it in the desired position.

Figure 6:
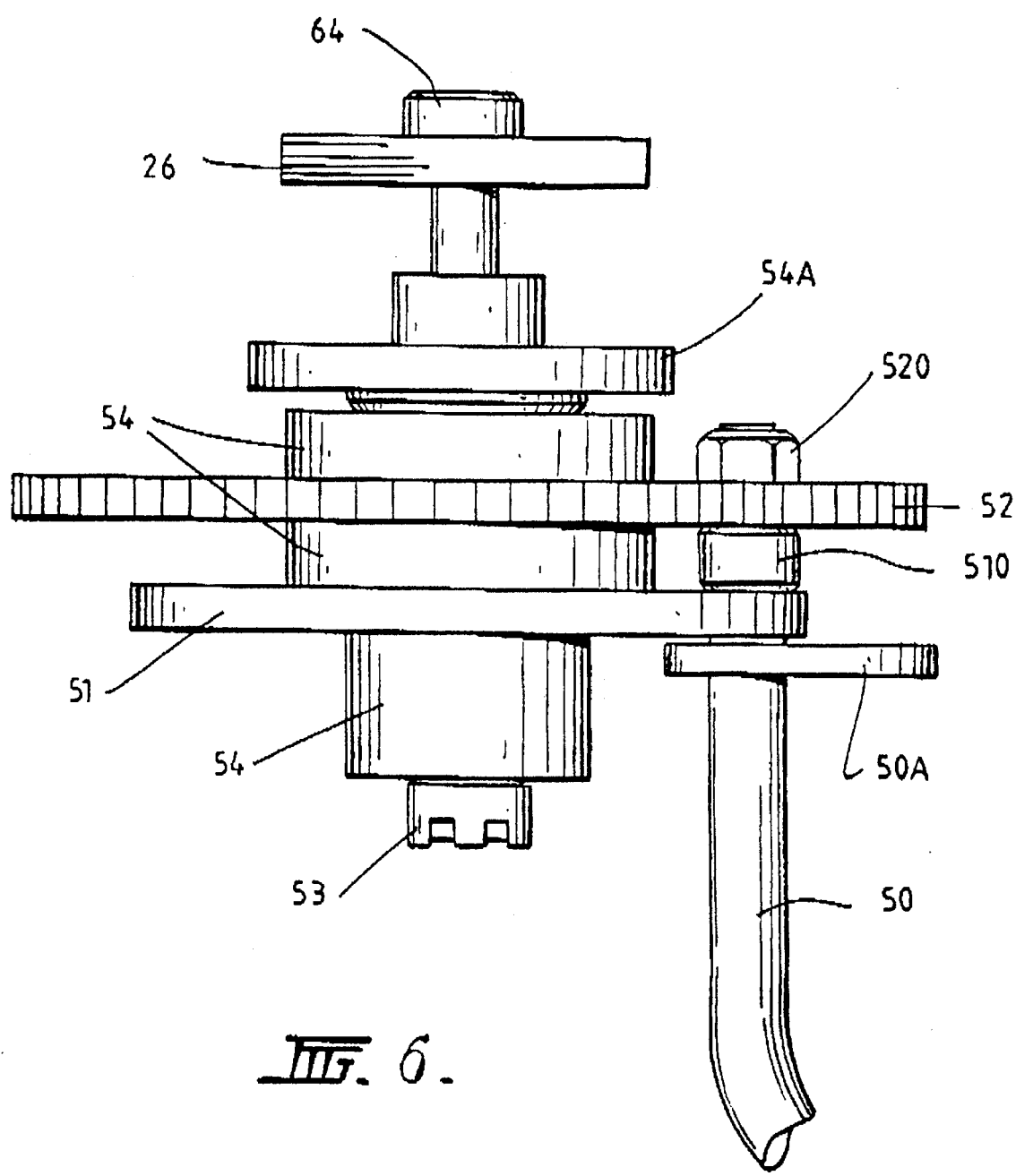
FIG. 6 is a side elevation of a hub and connectors together with a broken-away view of a tine.
Figure 7:
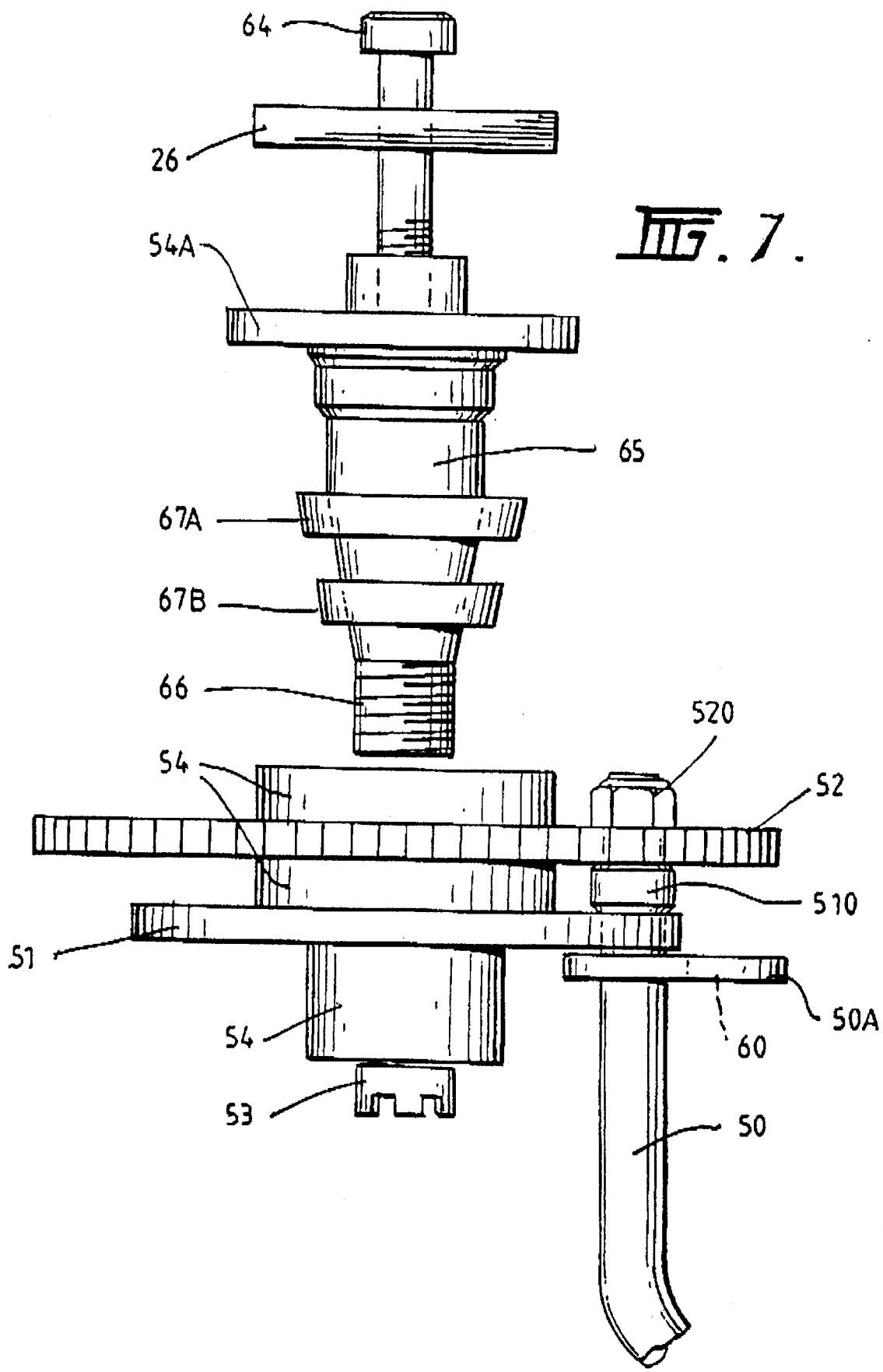
FIG. 7 is a side elevation of the hub, connector and tine of FIG. 6, partially exploded to show its working.

Turning to FIGS. 6 and 7, the tine and hub assembly is shown in more detail. Thus tine 50 penetrates tine plate 51 through rotating cam 50A. Tine 50 then penetrates spacer 510 located between tine plate 51 and sprocket 52, being secured to sprocket 52 by nut 520. Retaining nut 53 is threaded onto a journal end (see later) and supports a hub 54. This hub penetrates the central portion of tine plate 51 and also the central portion of sprocket 52. Hub 54 abuts shaft support means 54A which in turn is penetrated from above by bolt 64. This bolt also penetrates support plate 26. A journal 65 is threaded onto the lower region of shaft support means 54A, tapering to threaded end 66 to which is attached nut 53. Tapered roller bearings, 67A and 67B surround the tapering region of journal 65 and serve to facilitate rotational movement of hub 54.

Figure 8:
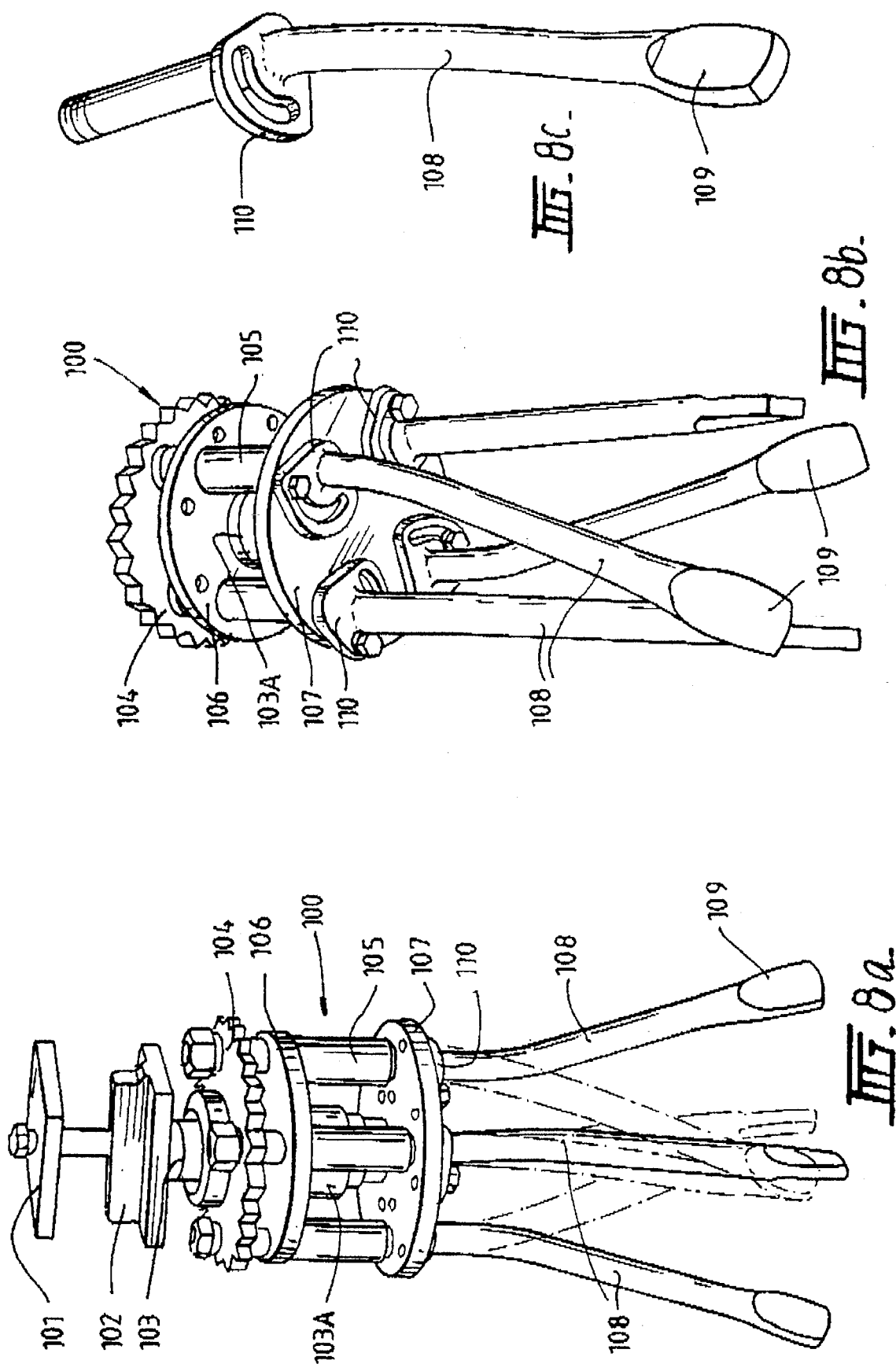
FIG. 8(a) is a side view of another embodiment of a tine means with certain of the tines illustrated in ghost lines.
FIG. 8(b) is a side view from underneath of the tine means of FIG. 8(a)
FIG. 8(c) is a side view from the working end of one of the tines of FIGS. 8(a) and 8(b)

FIGS. 8(a) 8(b) and 8(c) show the use of a set of circumferentially-spaced, longitudinal spacers in line with individual tines. A tine means 100 comprises a retaining plate 101 to retain the tine means upon an element of a frame (not shown). This retaining plate co-operates with a locating slide plate 102. The tine means itself rotates around a hub 103/103A, the hub being driven by a drive sprocket 104. A number of hollow, round spacers extend between upper plate 106 and lower plate 107 arranged around hub 103/103A. A number of tines 108 corresponding to the number of spacers 105 extend through plate 107, spacers 105 and plate 106, being bolted to the upper plate. Each spacer terminates in a spade end 109 at its operative end. Numeral 110 refers to a rotating cam.

The inward curve of the tines and their flattened ends allow the tines to rotate inwards in an overlapping manner without collision.

Figure 9:
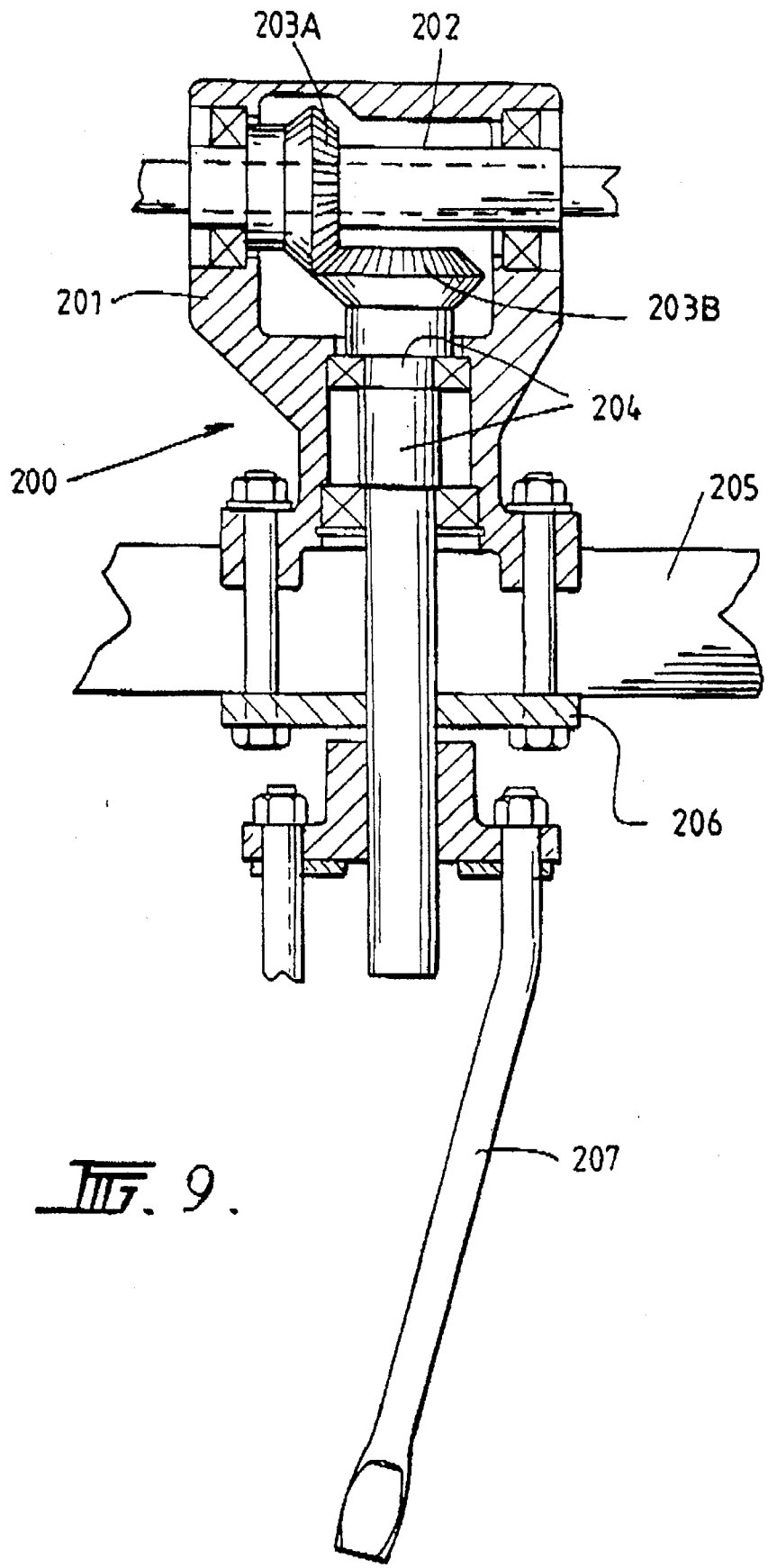
FIG. 9 is a side view in cross-section of another alternative embodiment of a tine means.

FIG. 9 shows the use of a hydraulic motor to rotate the tines. Numeral 200 refers to a tine means comprising a tine mount 201. A square section solid shaft 202 penetrates this mount and drives gear elements 203A and 203B. These gear elements in turn drive hub 204. Tine mount 201 sits on top of element 205 of a frame (not shown) and is held to that element by a sliding mount 206. One tine is shown indicated by numeral 207.

The claims defining the invention are as follows:

1. A cultivator for attachment to a tractor for use in cultivating rows of plants, comprising:
   a rotary tine assembly comprising a plurality of substantially vertically-oriented, rotary tine sets for cultivating soil on each side of a row of plants, each rotary tine set including at least one rotary tine;
   shield means associated with each row of plants for limiting throwing of soil by said rotary tines;
   drive means for rotating the rotary tine sets to cultivate said soil;
   support structure means for securing the rotary tine sets, the shield means, and the drive means thereto such that the rotary tine sets are oriented relative to each other in a generally transverse direction to a direction of travel of the tractor, and which is adapted for connection to the tractor;

means for adjustably moving each tine set relative to other ones of said tine sets in said generally transverse direction;

wherein dimensions of and relative adjustments of the tine sets and the shield means are chosen so that a predetermined amount of soil passes between selected shield means, whereby weeds between adjacent rows of plants are uprooted and destroyed and soil is ridged and heaped around the plants and in the rows.

2. A cultivator as claimed in claim 1, wherein said plurality of vertically-oriented, rotary tine sets includes:

at least one interior rotary tine set for cultivation beside the rows of plants, and at least one exterior, rotary tine set located outside each shield means for cultivation outside the rows of plants.

3. A cultivator as claimed in claim 2, wherein each shield means comprises plate means, each plate means being positioned substantially vertically and being so shaped as to guide plants into a protected region within each shield means.

4. A cultivator as claimed in claim 1, wherein each rotary tine set includes toothed sprocket means, and the drive means for the rotary tine sets includes an endless chain adapted to co-operate with the toothed sprocket means forming part of each rotary tine set.

5. A cultivator as claimed in claim 1, wherein the drive means comprises at least one hydraulic motor.

6. A cultivator as claimed in claim 1, wherein there are a plurality of said tines for each tine set, and the drive means includes a drive motor for driving the plurality of tines of each set by a common drive shaft.

7. A cultivator as claimed in claim 1, wherein the tractor includes a three-point linkage, and the support structure means is connected to the three-point linkage of the tractor for improved stability of connection and guidance of the cultivator.

8. A cultivator as claimed in claim 1, wherein the tractor includes a chassis, and the support structure means is adjustable from a standard position above the earth and adjacent to the chassis of the tractor to an operative position for cultivation of the earth.

9. A cultivator as claimed in claim 1, further comprising:

raising and lowering means for raising and lowering the cultivator so that the tines contact the soil to a desired degree, and sensor arm means for sensing a level of the soil and for transmitting a signal to the raising and lowering means.

10. A cultivator as claimed in claim 1, wherein the cultivator is mountable on a front of the tractor.

11. A rotary tine means for use in a cultivator, comprising:

a hub;

connector means for attachment of the hub to a cultivator; and a plurality of rotary tines attached to the hub, each tine being adapted for positioning in one of:

(a) a substantially vertical configuration in use;

(b) a variable angular configuration in use; and at a variable distance from an axial line through the hub to provide an adjustable working perimeter; and wherein the tines are so shaped that, in operation, adjustment of their attachment to the hub alters at least one of the area and depth of soil cultivated.

12. A cultivator as claimed in claim 5, wherein the drive means comprises a series of hydraulic motors coupled together.

13. A cultivator as claimed in claim 6, further including individual gear boxes for coupling the common drive shaft to the plurality of tines of a tine set.

14. A cultivator as claimed in claim 1, wherein the cultivator is mountable on a rear of the tractor.

15. A cultivator as claimed in claim 1, wherein the cultivator is mid-mounted under the tractor.

16. A cultivator as claimed in claim 1, wherein each said tine set includes a plurality of tines, with lower portions of each said tine being bent relative to upper portions thereof, and further comprising means for adjusting an angular orientation of each said tine such that a position of a working lower end of said tine is changed relative to other tines of the same tine set.

17. A cultivator as claimed in claim 1, further comprising raising and lowering means for raising and lowering the tine sets, irrespective of a ground condition.

18. A cultivator for attachment to a tractor for use in cultivating rows of plants, comprising:

a rotary tine assembly comprising a plurality of substantially vertically-oriented, rotary tine sets for cultivating soil on each side of a row of plants, each rotary tine set including a plurality of rotary tines, with lower portions of each said tine being bent relative to upper portions thereof;

means for adjusting an angular orientation of each said tine such that a position of a working lower end of said tine is changed relative to other tines of the same tine set;

shield means associated with each row of plants for limiting throwing of soil by said rotary tines;

drive means for rotating the rotary tine sets to cultivate said soil;

support structure means for securing the rotary tine sets, the shield means, and the drive means thereto such that the rotary tine sets are oriented relative to each other in a generally transverse direction to a direction of travel of the tractor, and which is adapted for connection to the tractor;

means for adjustably moving each tine set relative to other ones of said tine sets in said generally transverse direction; and raising and lowering means for raising and lowering the cultivator so that the tines contact the soil to a desired degree;

wherein dimensions of and relative adjustments of the tine means and the shield means are chosen so that a predetermined amount of soil passes between selected shield means, whereby weeds between adjacent rows of plants are uprooted and destroyed and soil is ridged and heaped around the plants and in the rows.

* * * * *

UNITED STATES PATENT AND TRADEMARK OFFICE
CERTIFICATE OF CORRECTION

PATENT NO.   : 5,632,344
DATED        : May 27, 1997
INVENTOR(S)  : Wolfram Michael FIX It is certified that error appears in the above-indentified patent and that said Letters Patent is hereby corrected as shown below:

Column 1, line 37, change "themes" to -- means --.

Signed and Sealed this

Fourteenth Day of October, 1997

*Attest:*

BRUCE LEHMAN

*Attesting Officer*       *Commissioner of Patents and Trademarks*